United States Patent
Sharp et al.

(10) Patent No.: US 8,638,400 B2
(45) Date of Patent: Jan. 28, 2014

(54) FIELD-OF-VIEW COMPENSATED POLARIZATION SWITCH FOR SHORT-THROW 3D PROJECTION

(75) Inventors: Gary D. Sharp, Boulder, CO (US); Jianmin Chen, Superior, CO (US); Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 5 days.

(21) Appl. No.: 13/182,381

(22) Filed: Jul. 13, 2011

(65) Prior Publication Data

US 2012/0013813 A1    Jan. 19, 2012

Related U.S. Application Data

(60) Provisional application No. 61/363,826, filed on Jul. 13, 2010, provisional application No. 61/384,629, filed on Sep. 20, 2010.

(51) Int. Cl.
*G02F 1/1335* (2006.01)

(52) U.S. Cl.
USPC .................................. 349/15; 349/5; 349/96

(58) Field of Classification Search
None
See application file for complete search history.

(56) References Cited

U.S. PATENT DOCUMENTS

| | | | |
|---|---|---|---|
| 4,792,850 A | 12/1988 | Lipton et al. | |
| 7,528,906 B2 | 5/2009 | Robinson | |
| 7,633,666 B2 | 12/2009 | Lipton et al. | |
| 2005/0259205 A1* | 11/2005 | Sharp et al. | 349/129 |
| 2006/0291053 A1* | 12/2006 | Robinson et al. | 359/465 |
| 2008/0316303 A1 | 12/2008 | Chiu et al. | |
| 2009/0147160 A1 | 6/2009 | Roosendaal | |
| 2011/0032345 A1 | 2/2011 | Robinson et al. | |
| 2011/0032439 A1 | 2/2011 | Robinson et al. | |
| 2011/0032440 A1 | 2/2011 | Robinson et al. | |

FOREIGN PATENT DOCUMENTS

| | | |
|---|---|---|
| JP | 2004-233485 A | 8/2004 |
| WO | 2008-086725 A1 | 7/2008 |

OTHER PUBLICATIONS

International search report and written opinion of the international searching authority for PCT/US2011/043913 dated May 20, 2012.
G. Sharp et al., Polarization Engineering for LCD Projection, 2005, John Wiley & Sons, Ltd.

* cited by examiner

*Primary Examiner* — Thanh-Nhan P Nguyen
(74) *Attorney, Agent, or Firm* — Neil G. J. Mothew; Darlene K. Kondo

(57) ABSTRACT

Generally, this disclosure concerns the angle sensitivity of polarization switch elements and the resulting impact of the ray direction on performance. More specifically, apparatus and techniques for compensating the angular sensitivity of liquid crystal (LC) polarization switches are described that enhance the performance of polarization switches. For example, a polarization switch is disclosed that transforms linearly polarized light of an initial polarization orientation that includes a first and second liquid crystal cell with a compensator located between the LC cells. The compensator layer is operable to enhance the field of view through the polarization switch. Such compensation techniques are particularly useful for short-throw projection environments.

28 Claims, 7 Drawing Sheets

500 ments are illustrated by way of example in the
FIELD-OF-VIEW COMPENSATED POLARIZATION SWITCH FOR SHORT-THROW 3D PROJECTION

CROSS-REFERENCE TO RELATED APPLICATIONS

This application claims priority to (1) U.S. Provisional Patent Application Ser. No. 61/363,826, filed Jul. 13, 2010, entitled "Field-Of-View Compensated Polarization Switch for Short-Throw 3D Projection," and also claims priority to (2) U.S. Provisional Patent Application Ser. No. 61/384,629, filed Sep. 20, 2010, entitled "Field-Of-View Compensated Polarization Switch for Short-Throw 3D Projection," the entirety of both is herein incorporated by reference.

TECHNICAL FIELD

This disclosure generally relates to stereoscopic display systems. In particular, it relates to sequential 3D stereoscopic displays, including short-throw projection systems and direct view displays with polarization switches that exhibit high contrast at a large angle of incidence.

BACKGROUND

Modern stereoscopic 3D cinema typically utilizes a single digital projector synchronized with a polarization switch as a means of delivering two views. Passive polarizing eyewear decodes the sequential images, delivering the appropriate perspective to each eye. At the system level, one eye receives the appropriate perspective image while the other (ideally) receives little to substantially no information. In the likely event that a percentage of the improper image leaks when the shutter is in the closed-state, the quality of the 3D experience is degraded. The level of this ghost image depends upon many contributors, which can include the projector, the polarization switch, the screen, the eyewear, and the geometry associated with a ray through the system.

BRIEF SUMMARY

In direct view sequential 3D, a polarization switch can be placed at the output of the display. This can include an LCD, a plasma display, an OLED, or any suitable display technology. The polarization switch is operated synchronously with the display, and may include a scrolling shutter, as described in pending applications, e.g., U.S. patent application Ser. Nos. 12/156,683; 12/853,274; 12/853,279; and 12/853,265, all of which are herein incorporated by reference. In order that multiple viewers have a similar high contrast experience, it is desirable that the shuttering operation is effective when the display is viewed from many different angles. This may require an acceptable 3D experience at half-angles exceeding 40-degrees horizontal. Conventional polarization switches, such as the ZScreen, do not offer such performance.

The angle sensitivity of polarization switch elements and the resulting impact of the ray direction on performance and methods for enhancing performance by compensating for such effects are discussed herein. More specifically, methods for compensating the angular sensitivity of liquid crystal (LC) polarization switches are described. In one embodiment, the symmetry of a dual-cell polarization switch may be utilized to introduce one or more compensation layers that may enhance the contrast and efficiency over a range of angles.

In another embodiment, compensation layers may be introduced. A first compensation layer may be located between the LC cells, and a second compensation layer may be located between the analyzing circular polarizer and the polarization switch, to further enhance the FOV. In one embodiment, both compensators are negative C-plates, in which the retardation of the compensator between the cells has approximately the same (splay-state) retardation as the LC cell, while the compensator between the viewer and the ZScreen has approximately half of the (splay-state) retardation of the cell.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which.

DETAILED DESCRIPTION

Generally, the present disclosure concerns the angle sensitivity of the polarization switch elements and the resulting impact of the ray direction on performance. Techniques for enhancing the performance by compensating for such effects are disclosed. More specifically, apparatus and methods for compensating the angular sensitivity of liquid crystal (LC) polarization switches are described herein. In one embodiment, the symmetry of a dual-cell polarization switch may be utilized to introduce one or more compensation layers that enhance the contrast and efficiency over a range of angles. Furthermore, a compensation layer may be located between the polarization switch and the analyzing circular polarizer eyewear to further enhance at least the contrast and efficiency over a range of angles. The latter may be affixed to the polarization switch between the exit LC cell and a glass end-cap.

It should be noted that embodiments of the present disclosure may be used in a variety of optical systems and projection systems. The embodiments may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system using a polarization switch. Accordingly, embodiments of the present disclosure may be employed in optical systems, devices used in visual and/or optical presentations, visual peripherals and so on and in a number of computing and/or telecommunications environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Figure 1:
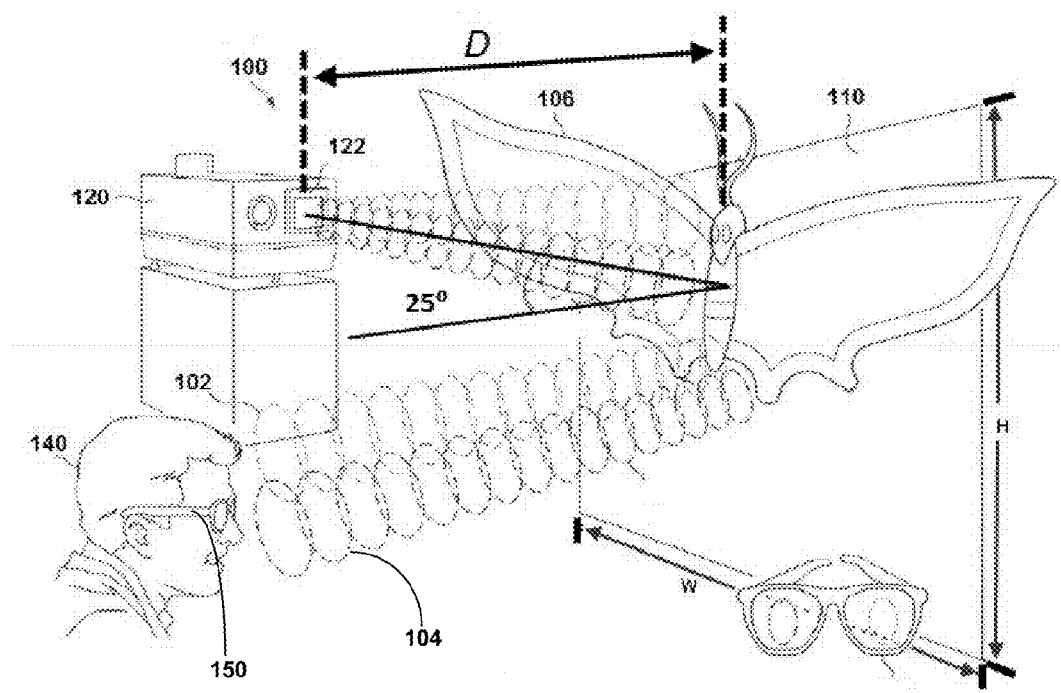
FIG. 1 is a schematic diagram illustrating the operation of an exemplary three-dimensional movie projection system, in accordance with the present disclosure.

FIG. 1 is a schematic diagram illustrating the operation of a stereoscopic three-dimensional movie projection system 100 using a single-projector (sequential) platform 120. In operation, left-eye images 102 and right-eye images 104 may be projected sequentially from the projector 120 through polarization switch 122 toward a polarization-preserving screen 110. Polarization-preserving screen 110 allows the polarized light from the projector 120 and polarization switch 122 to be reflected to the moviegoer 140. The left- and right-eye images are viewed by the moviegoer 140 wearing eyewear 150 that decodes the respective orthogonally polarized light to create the experience of depth for object 106. Generally, the quality of the stereoscopic viewing experience may depend upon the ability of the system 100 to preserve the high degree of polarization transmitted by the projector platform 120.

Currently, LC polarization switches 122 may be operated at the output of the projection lens. Throw ratios can vary considerably depending upon theatre geometry. Throw ratio is defined as the ratio of distance from the projector-to-screen to the screen width. Stated differently, the throw ratio may be expressed:

Throw ratio=$D/W$

The distance D and width W are shown in FIG. 1.

Low throw-ratios, for example less than 1.2, in which the projector is approximately 1.2 feet away from the screen for every foot of screen width, may place significant demands on the angular performance of LC elements, which may lead to contrast and efficiency loss. It is not uncommon for the ray to exceed approximately 25° with respect to normal, in air, as shown by FIG. 1.

A ZScreen is an example of a polarization switch 122 which may have an input linear polarizing means, followed by a pair of LC elements (π-cells) with crossed rubbing directions, oriented at approximately ±45° with respect to the polarizer. Examples may include, U.S. Pat. No. 4,792,850, FIGS. 3-11 and the related description. Examples of ZScreen polarization switches are described in commonly-assigned U.S. Pat. No. 4,792,850, and 7,633,666 to Lipton et al., both of which are herein incorporated by reference. Another example of a polarization switch is described with reference to commonly-owned U.S. Pat. No. 7,528,906 to Robinson, herein incorporated by reference.

With reference to the ZScreen, the π-cells operate substantially synchronously, such that when one cell is in a high voltage state (VH), the other cell may be in a low voltage state (VL), or holding voltage. When the voltages are swapped, the cells may collectively behave like a quarter-wave retarder with optic axis switchable between orientations of approximately ±45°. When paired with matched circular polarizing eyewear lenses, the result in principle, may be a high contrast neutral off-state, with the chromatic on-state associated with a zero-order half-wave retarder. This relatively ideal set of circumstances breaks down when the ray direction through the ZScreen deviates from the normal direction.

At approximately normal incidence, the π-cell functions as a linear variable retarder. However, the π-cell may not function as a linear variable retarder at other incidence angles, due to the inhomogeneity of the director profile. One consequence of the director distribution associated with a π-cell is that the cell contains significantly greater retardation than is required to accomplish the required switching. For instance, it may be desirable to use a cell with over approximately 500 nm of retardation in order to deliver approximately 140 nm of switching. This additional retardation may have a negative impact on Field of View (FOV) performance. In general, the behavior is not a pure retardation shift off-normal, due to the director profile. As such, techniques for increasing the FOV using film compensation have limited effectiveness.

Polarization compensators are generally described in the book by G. Sharp et al., *Polarization Engineering for LCD Projection* (2005), herein incorporated by reference. Polarization compensators may be used to enhance the FOV of direct view LC displays. The compensation scheme may depend upon the LC mode and cell recipe. Several modes may be used in current LCD products, including In Plane Switching (IPS), Vertically Aligned (VA), and Twisted Nematic (TN) products, with a compensation scheme for each. There are many compensator films available, with a relatively large number of options for A-plate and C-plate behavior, with compensators having O-plate (oblique) behavior being relatively rare. Examples of the former or both the A-plate and the C-plate, are manufactured by casting/extrusion and stretching of polymer films. An example of the latter or O-plate is the WV film supplied by Fuji, having a discotic LC polymer coated on a Triacetylcellulose (TAC) sheet. It is advantageous to identify compensation schemes which are effective, but are also plentiful in supply, with multiple suppliers.

Polarization switches, unlike active matrix display devices, may be operated at relatively high voltage levels. One benefit of operating at these voltage levels may include more rapid switching, while maximizing retardation swing. This has the further benefit of substantially homogenizing the director profile in the fully energized state, thus increasing the effectiveness of the compensation. A π-cell in the VH state may behave substantially like a positive C-plate, provided that the voltage is sufficiently high. That is, the LC material behaves like a positive uniaxial retarder with optic axis approximately normal to the substrate. According to the present disclosure, the VH voltage amplitude may exceed approximately 20V, for example, across an approximately 3.5 micron cell, in order to achieve a substantially homogeneous director profile. A DC balanced waveform may be used to insure long-term reliability and performance of the cell, which may otherwise be degraded by ion migration. While unswitched material may remain at the boundary, it may have little impact on performance provided that the voltage is adequate. Conversely, the π-cell in the VL state may have a highly inhomogeneous director profile, which may be relatively difficult to compensate.

Figure 2A:
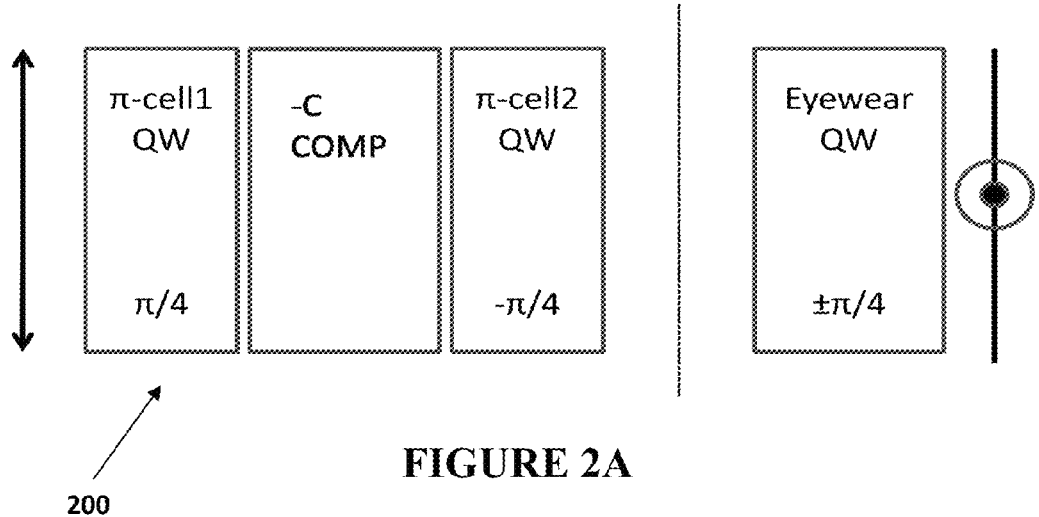
FIG. 2A illustrates the layout of a ZScreen with analyzing eyewear, in accordance with the present disclosure.
Figure 2B:
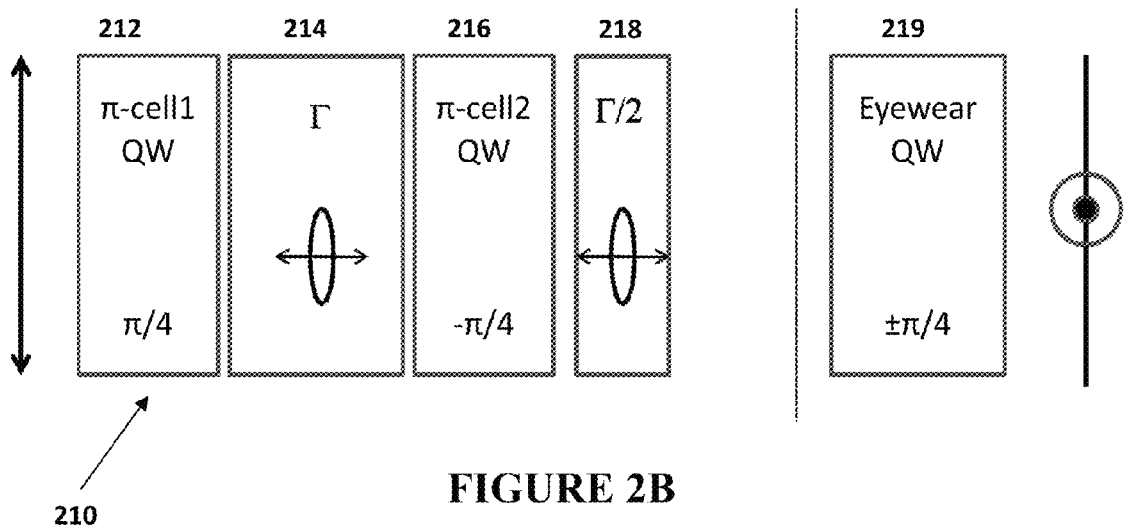
FIG. 2B illustrates another layout of a ZScreen with analyzing eyewear, in accordance with the present disclosure.

According to one embodiment of this disclosure, a negative C-plate compensator, or any compensator of similar functionality, may be inserted between the two cells as shown in FIG. 2A. Since one cell may always be approximately fully energized in the operation of the ZScreen, the negative C-plate can insure that the fully energized cell does not contribute significantly to loss in FOV. Moreover, introduction of a negative C-plate between the ZScreen and the eyewear, as shown in FIG. 2B, may achieve an additional FOV enhancement. The benefits of a properly designed compensator are given by way of example.

According to the present disclosure, the Field-of-View (FOV) compensated polarization switch may be designed by evaluating the ON-state color and luminance uniformity, as well as the OFF-state polarization contrast ratio. The OFF-state polarization contrast ratio represents the 3D ghost level, or cross-talk. For a system designed for maximum performance at normal incidence, one or more of these performance metrics may be degraded as the incidence angle is increased. The loss in performance is also generally dependent upon the azimuth angle. The analysis discussed herein, primarily concentrates on performance at 30° incidence angle in air, which is representative of a low throw-ratio, for example approximately 1.0, scenario for a cinema environment. The color uniformity may be measured as the rms deviation in ON-state xy color coordinate of a particular ray through the ZScreen, relative to the normal incidence color coordinate. This calculation is weighted by the spectrum of a typical DLP cinema projector in the full-white state. However, it does not include other second-order chromatic effects, such as polarizer absorption and Indium Tin Oxide (ITO) absorption/reflection which tend to have more impact in the blue.

TABLE 1

Performance of a ZScreen, both with and without negative C-Plate compensation at a substandard-case azimuth angle with an incidence angle of 30°.

| State | Cell 1 | Cell 2 | QW | Compensation | Substandard-Case Output |
|---|---|---|---|---|---|
| 1. ON | VL | VH | 45 | 0 | $\Delta xy = 0.11$ $\Delta L = -31.6\%$ |
| 2. ON | VL | VH | 45 | -550/-250 nm | $\Delta xy = 0.01$ $\Delta L = -1.1\%$ |
| 3. ON | VH | VL | -45 | 0 | $\Delta xy = 0.13$ $\Delta L = -31.2\%$ |
| 4. ON | VH | VL | -45 | -550/-250 nm | $\Delta xy = 0.01$ $\Delta L = -1.1\%$ |
| 5. OFF | VL | VH | -45 | 0 | Contrast = 2.6 |
| 6. OFF | VL | VH | -45 | -550/-250 nm | Contrast = 102 |
| 7. OFF | VH | VL | 45 | 0 | Contrast = 3.1 |
| 8. OFF | VH | VL | 45 | -550/-250 nm | Contrast = 97 |

The ON-state spectrum of the ZScreen is associated with a zero-order half-wave retarder, due to the combined action of, for example, a polycarbonate QW (eyewear) retarder with the ZScreen QW retarder. The results shown in Table 1 include the birefringence dispersion associated with both of these materials. For this particular case, the center wavelength is selected as 516 nm. While this does not necessarily maximize the luminance, it does provide a more balanced response between the blue and red.

Figure 3:
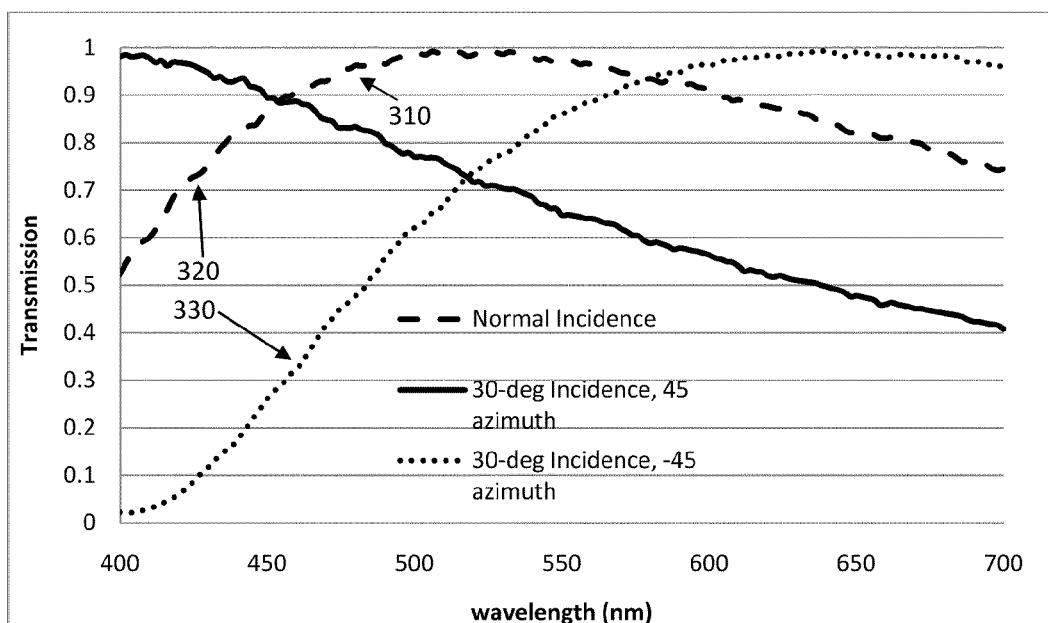
FIG. 3 is a graph illustrating the ON-state spectrum for normal-incidence and two substandard-case azimuth angles, in accordance with the present disclosure.

FIG. 3 is a graph 300 showing the spectral response for the ON-state spectrum 310 of an uncompensated ZScreen at normal incidence, as well as two spectrums 320 and 330 with specific azimuth angles (45 azimuth and −45 azimuth) at approximately 30° off-normal. Both blue and red shifts in the spectrum are represented, with pronounced consequences to both brightness and color, as viewed through the glasses at these extreme angles.

FIGS. 2A and 2B illustrate various layouts of a ZScreen with analyzing eyewear. The example layout 200 of FIG. 2A includes a first liquid crystal cell 202, a compensator 204, a second liquid crystal cell 206 and eyewear 208. Additionally, the example layout 210 of FIG. 2B includes a first liquid crystal cell 212, a first compensator 214, a second liquid crystal cell 216, a second compensator 218 and eyewear 219. The compensators of FIGS. 2A and 2B may be utilized to alter the FOV of LC displays and the compensation scheme may depend upon the LC mode and cell recipe.

A 4×4 Berreman matrix formalism may be used to trace the state of polarization through the structures illustrated in FIG. 2A and FIG. 2B for various combinations of voltage state and analyzing quarter-wave orientation. The model calculates the director profile of the π-cell in each voltage state, and then partitions it into a sufficiently large number of thin homogeneous layers for matrix propagation. The LC parameters may be appropriate for a typical high-birefringence fluid used in fast-switching π-cells, with a fully energized voltage of 20V, and a holding voltage of 3.5 V. The low-voltage setting may be selected to match the LC retardation to the analyzing quarter wave, which may yield a high contrast at normal incidence, for example, a contrast greater than 3,000:1.

The polarizer may have a high transmission with up to substantially 100% transmission along one direction, with substantially zero percent transmission along the orthogonal direction. Additionally, the polarizer may contain an approximately 60 nm negative C-plate compensator on either side of the functional layer to represent the TAC contribution. An LC cell of the Zscreen may contain a retardation range of approximately 500 nm to 700 nm of retardation, with some variation due to the dispersion of LC fluid. The analyzer may be a QW retarder with approximately 125 nm of retardation at approximately 589 nm and the approximate dispersion of polycarbonate (PC). The negative C-plate compensator may be selected for improved FOV performance, and for the purpose of this model, may be taken to be substantially dispersionless.

Figure 4:
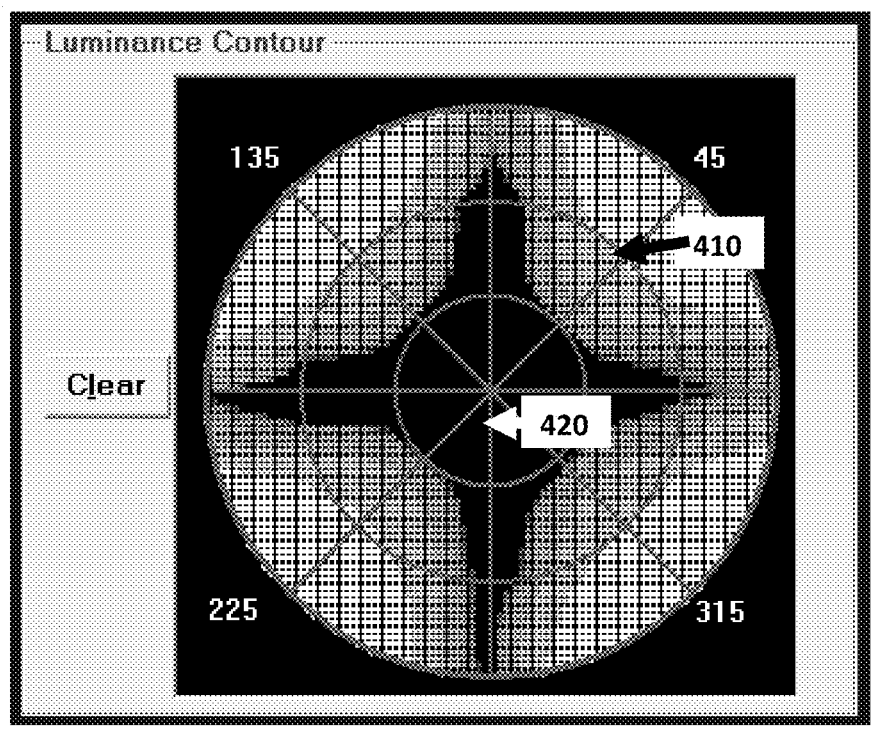
FIG. 4 is a polar plot of the OFF-state leakage of an uncompensated ZScreen, out to a maximum incidence angle of 30°, in accordance with the present disclosure.
Figure 5:
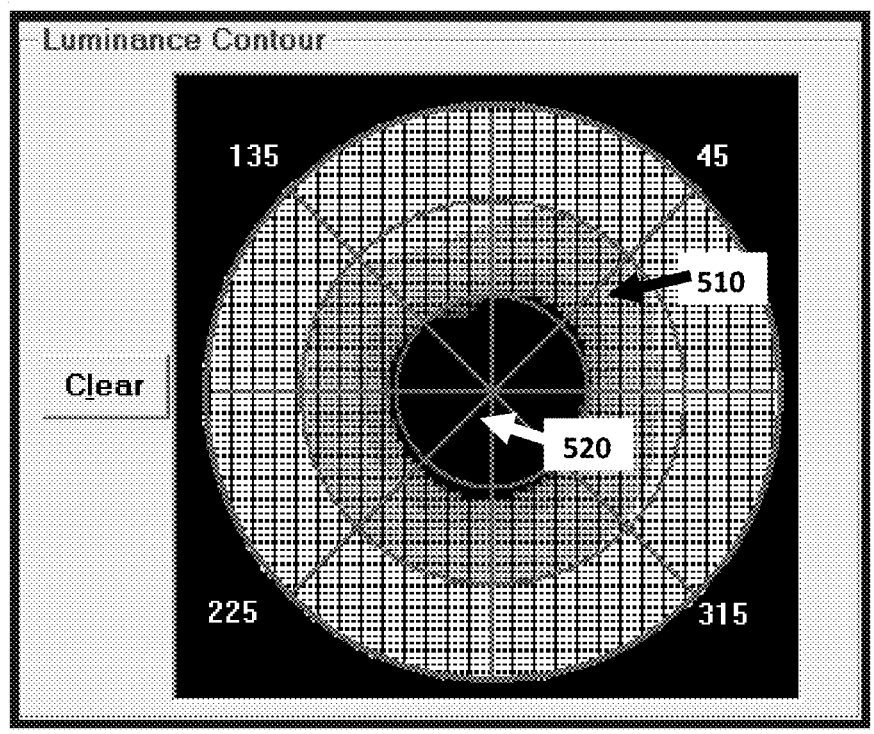
FIG. 5 is a polar plot of the OFF-state leakage of an uncompensated ZScreen, out to a maximum incidence angle of 30°, in accordance with the present disclosure.

FIGS. 4 and 5 are two polar plots, 400 and 500 respectively, of the OFF-state leakage of an uncompensated ZScreen, out to a maximum incidence angle of 30°. The substandard-case azimuth performance of azimuth angles −45 and +45 are summarized in lines 5 and 7 of Table 1, respectively. In FIG. 4, the cross hatched area 410 illustrates areas of leakage, and the black area 420 on the plot 400, represents areas of substantially no leakage. Similarly in FIG. 5, the cross hatched area 510 illustrates leakage areas and the black area 520 represents areas of substantially no leakage. Additionally, while the azimuth angles of −45 and +45 may be different in character, the performance at the substandard-case azimuth angles may be similar, as shown in Table 1. Furthermore, Table 1 illustrates that an uncompensated ZScreen may have both a significant ON-state loss in brightness off-normal of greater than approximately 30%, as well as a color shift of approximately 0.13. The contrast ratio, calculated as the ratio of ON-state lumens to OFF-state lumens at approximately 30° for the substandard-case azimuth angle, is roughly 3:1. Such performance may be unacceptable for a high quality stereoscopic experience.

A first negative C-plate compensator may be inserted between the liquid crystal cells, and a second negative C-plate compensator may be inserted between the ZScreen and the analyzing circular polarizer (eyewear) as shown in FIG. 2B. The system performance metrics may be evaluated as a function of retardation value. When the retardation of the first compensator between the liquid crystal cells is roughly matched to the net retardation of either one of the liquid crystal cells, and the retardation of the second compensator has roughly half of the net retardation of either one of the liquid crystal cells, improved FOV performance may be achieved. Furthermore, the retardation of the first negative C-plate compensator may be in the approximate range of 60-80% of the splay state retardation of one of the first or second LC cells of the Zscreen.

Figure 6A:
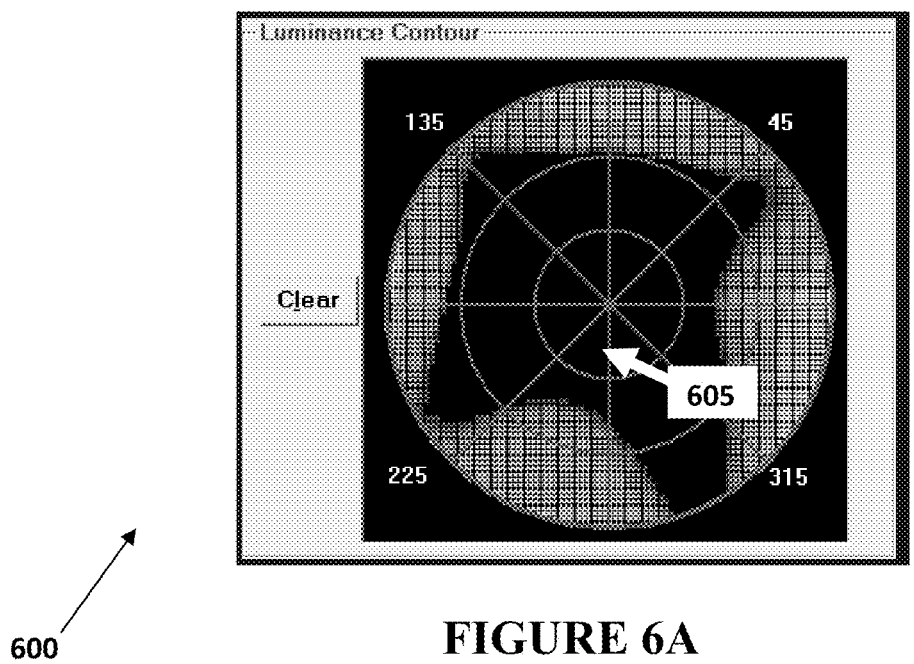
FIG. 6A is a polar plot showing an OFF-state polar leakage plot with −550 nm of negative C-plate retardation, corresponding to the state shown in FIG. 2A, in accordance with the present disclosure.
Figure 6B:
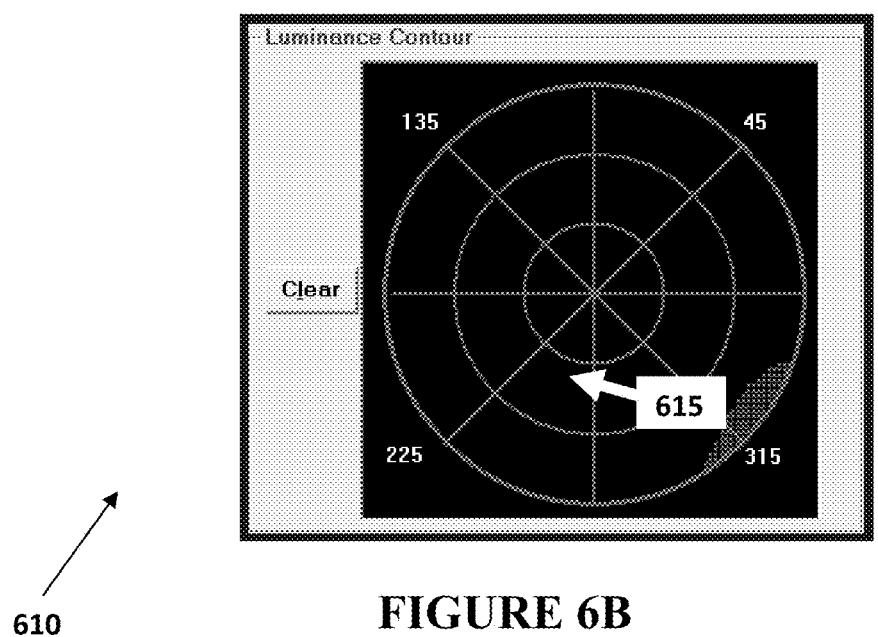
FIG. 6B is a polar plot showing an OFF-state polar leakage plot with −500 nm and −250 nm of negative C-plate retardation, corresponding to the state shown in FIG. 2B, in accordance with the present disclosure.

FIG. 6A is a polar plot 600 showing an OFF-state polar leakage plot with −550 nm of negative C-plate retardation, corresponding to the state shown in FIG. 4. FIG. 6B is a polar plot 610 showing an OFF-state polar leakage plot with −500 nm and −250 nm of negative C-plate retardation, corresponding to the state shown in FIG. 4. Plots 600 and 610 both illustrate larger areas of little leakage or substantially no leakage as compared to the black area 420 of FIG. 4. The areas of little leakage or substantially no leakage are represented as the black areas 605 and 615 on respective plots 600 and 610.

Figure 7A:
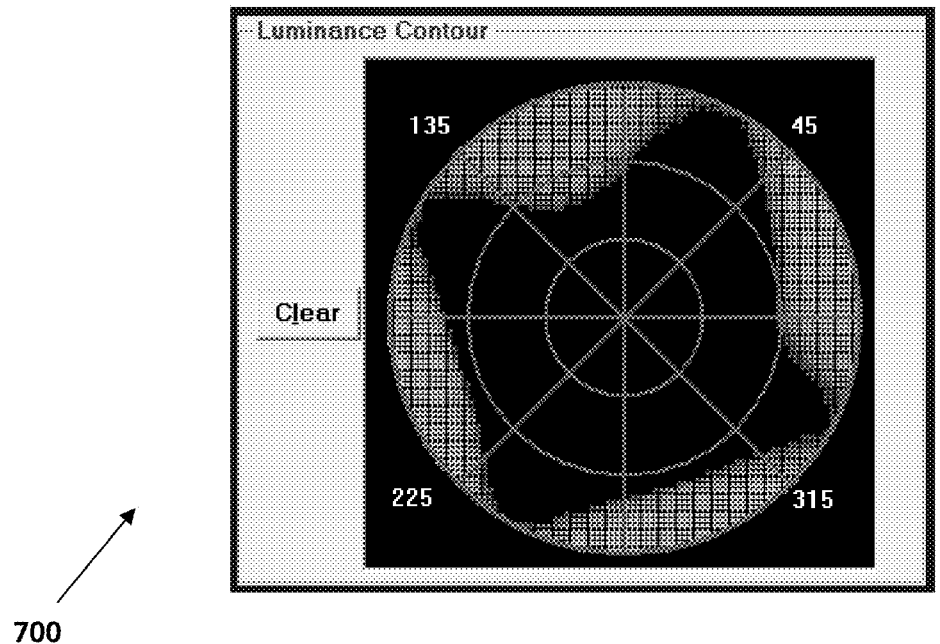
FIG. 7A is a polar plot showing an OFF-state polar leakage plot with −550 nm of negative C-plate retardation, corresponding to the state shown in FIG. 4, in accordance with the present disclosure.
Figure 7B:
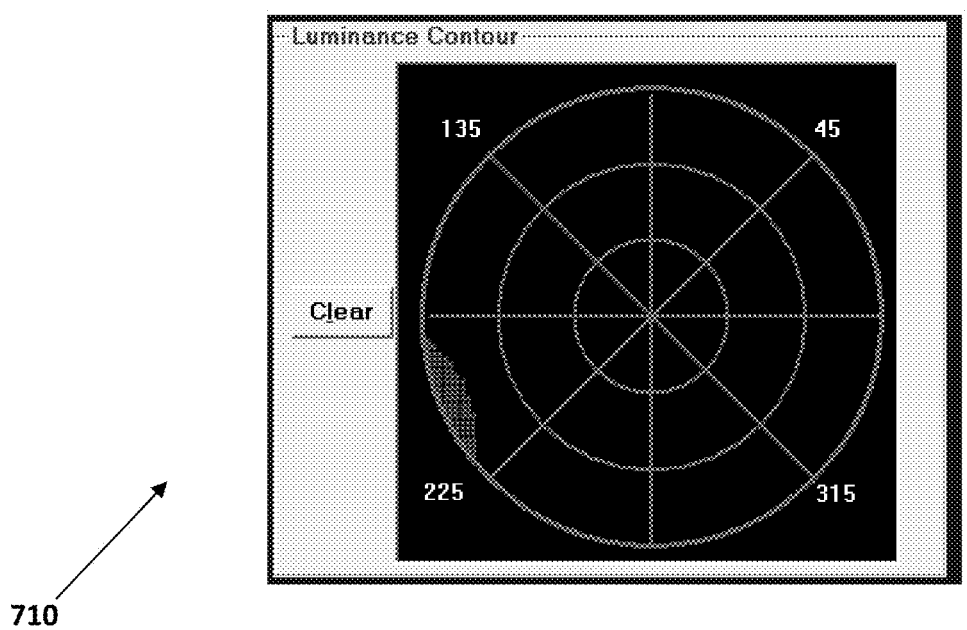
FIG. 7B is a polar plot showing an OFF-state polar leakage plot with −500 nm and −250 nm of negative C-plate retardation, corresponding to the state shown in FIG. 4, in accordance with the present disclosure.

FIG. 7A is a polar plot 700 showing an OFF-state polar leakage plot with −550 nm of negative C-plate retardation, corresponding to the state shown in FIG. 5. FIG. 7B is a polar plot 710 showing an OFF-state polar leakage plot with −500 nm and −250 nm of negative C-plate retardation, also corresponding to the state shown in FIG. 5. Table 1 summarizes the substandard-case azimuth performance, which may improve the three performance metrics relative to the uncompensated case. Similar to FIGS. 6A and 6B, the plots 700 and 710 of FIGS. 7A and 7B show larger areas of substantially no leakage when compared to the plot 500 of FIG. 5.

Other important metrics are for ON-state performance improvement and may show a reduction in luminance loss and color shift. A substandard-case luminance loss is approximately 1.1%, compared to approximately 31.6% for the uncompensated case. A substandard-case color shift is approximately 0.01, compared to approximately 0.13 for the uncompensated case.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items range between less than one percent to ten percent.

While various embodiments in accordance with the principles disclosed herein have been described above, it should be understood that they have been presented by way of example only, and not limitation. Thus, the breadth and scope of the embodiment(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A polarization switch that transforms linearly polarized light of an initial polarization orientation, comprising:
   a first liquid crystal cell having a first axis of orientation relative to the initial polarization orientation;
   a second liquid crystal cell having a second axis of orientation relative to the initial polarization orientation; and
   at least a first compensation layer located between the first liquid crystal cell and a first side of the second liquid crystal cell, the first compensation layer being operable to enhance the field of view through the polarization switch;
   wherein the first liquid crystal cell is operable to transform the linearly polarized light to a first circularly polarized light in a first state, and
   wherein the second liquid crystal cell is operable to transform the linearly polarized light to a second circularly polarized light in a second state different from the first state.

2. The polarization switch of claim 1, wherein the first compensation layer is a negative C-plate compensator.

3. The polarization switch of claim 1, wherein the first compensation layer has a retardation that approximately matches the net retardation of the first liquid crystal cell and the second liquid crystal cell.

4. The polarization switch of claim 1, wherein the first compensation layer comprises polycarbonate.

5. The polarization switch of claim 1, further comprising a second compensation layer.

6. The polarization switch of claim 5, wherein the second compensation layer is adjacent to a second side of the second liquid crystal cell.

7. The polarization switch of claim 6, wherein the second compensation layer is a negative C-plate compensator.

8. The polarization switch of claim 7, wherein the first compensation layer has a first compensation retardation in a range of approximately 60-80% of the splay-state retardation of one of the first or second liquid crystal cells.

9. The polarization switch of claim 8, wherein the second compensation layer has a second compensation retardation of approximately half of the splay-state retardation of one of the first or second liquid crystal cells.

10. A method for compensating the angular sensitivity of a polarization switch comprising:
    providing a first liquid crystal cell on an optical path;
    providing at least a first compensation layer located on the optical path after the first liquid crystal cell; and
    providing a second liquid crystal cell on the optical path after the at least first compensation layer;
    wherein the first liquid crystal cell is operable to transform linearly polarized light to a first circularly polarized light in a first state, and wherein the second liquid crystal cell is operable to transform linearly polarized light to a second circularly polarized light in a second state different from the first state.

11. The method for compensating the angular sensitivity of a polarization switch of claim 10, wherein the first compensation layer is a negative C-plate compensator.

12. The method for compensating the angular sensitivity of a polarization switch of claim 10, wherein the first compensation layer has a retardation that approximately matches the net retardation of the first liquid crystal cell and the second liquid crystal cell.

13. The method for compensating the angular sensitivity of a polarization switch of claim 10, wherein the first compensation layer has the dispersion of polycarbonate.

14. The method for compensating the angular sensitivity of a polarization switch of claim 10, further comprising providing a second compensation layer located on the optical path after the second liquid crystal cell.

15. The method for compensating the angular sensitivity of a polarization switch of claim 14, wherein the second compensation layer has a second compensation retardation of approximately half of the splay-state retardation of one of the first or second liquid crystal cells.

16. The method for compensating the angular sensitivity of a polarization switch of claim 10, wherein the second compensation layer is a negative C-plate compensator.

17. The method for compensating the angular sensitivity of a polarization switch of claim 10, wherein the first compensation layer has a first compensation retardation of approximately 60-80% of the same splay-state retardation of one of the first or second liquid crystal cells.

18. The method for compensating the angular sensitivity of a polarization switch of claim 10, further comprising providing a second compensation layer located on the optical path after the second liquid crystal cell, wherein the second compensation layer has a second compensation retardation of approximately half of the splay-state retardation of one of the first or second liquid crystal cells.

19. A projection system comprising:
a projection subsystem operable to output light; and
a polarization subsystem operable to receive the light from the projection subsystem, the polarization subsystem comprising:
a first liquid crystal cell on an optical path;
at least a first compensation layer located on the optical path after the first liquid crystal cell;
a second liquid crystal cell located on the optical path after the at least first compensation layer; and
at least a second compensation layer located on the optical path after the second liquid crystal cell;
wherein the first liquid crystal cell is operable to transform linearly polarized light to a first circularly polarized light in a first state, and
wherein the second liquid crystal cell is operable to transform linearly polarized light to a second circularly polarized light in a second state different from the first state.

20. The projection system of claim 19, wherein a substandard-case luminance loss of the projection system is approximately 1.1%.

21. The projection system of claim 19, wherein a substandard-case color shift is approximately 0.01.

22. A polarization switch that transforms linearly polarized light of an initial polarization orientation, comprising:
a first liquid crystal cell having a first axis of orientation relative to the initial polarization orientation;
a second liquid crystal cell having a second axis of orientation relative to the initial polarization orientation; and
at least a first compensation layer located between the first liquid crystal cell and a first side of the second liquid crystal cell, the first compensation layer being operable to enhance the field of view through the polarization switch,
wherein the first compensation layer has a retardation that approximately matches the net retardation of the first liquid crystal cell and the second liquid crystal cell.

23. The polarization switch of claim 22, further comprising a second compensation layer, wherein the second compensation layer is adjacent to a second side of the second liquid crystal cell, wherein the second compensation layer is a negative C-plate compensator, and wherein the first compensation layer has a first compensation retardation in a range of approximately 60-80% of the splay-state retardation of one of the first or second liquid crystal cells.

24. The polarization switch of claim 23, wherein the second compensation layer has a second compensation retardation of approximately half of the splay-state retardation of one of the first or second liquid crystal cells.

25. A method for compensating the angular sensitivity of a polarization switch comprising:
providing a first liquid crystal cell on an optical path;
providing at least a first compensation layer located on the optical path after the first liquid crystal cell; and
providing a second liquid crystal cell on the optical path after the at least first compensation layer,
wherein the first compensation layer has a retardation that approximately matches the net retardation of the first liquid crystal cell and the second liquid crystal cell.

26. The method for compensating the angular sensitivity of a polarization switch of claim 25, wherein the first compensation layer has a first compensation retardation of approximately 60-80% of the same splay-state retardation of one of the first or second liquid crystal cells.

27. A projection system comprising:
a projection subsystem operable to output light; and
a polarization subsystem operable to receive the light from the projection subsystem, the polarization subsystem comprising:
a first liquid crystal cell on an optical path;
at least a first compensation layer located on the optical path after the first liquid crystal cell;
a second liquid crystal cell located on the optical path after the at least first compensation layer; and
at least a second compensation layer located on the optical path after the second liquid crystal cell;
wherein a substandard-case luminance loss of the projection system is approximately 1.1%.

28. The projection system of claim 27, wherein a substandard-case color shift is approximately 0.01.

* * * * *